United States Patent
Hrdinova et al.

(10) Patent No.: US 9,775,372 B2
(45) Date of Patent: Oct. 3, 2017

(54) REAL FRUIT DRINK CONCENTRATE AND PROCESS OF PREPARING THE SAME

(71) Applicants: Erika Hrdinova, Glen Ellyn, IL (US); Rene Naglovsky, Glen Ellyn, IL (US)

(72) Inventors: Erika Hrdinova, Glen Ellyn, IL (US); Rene Naglovsky, Glen Ellyn, IL (US)

(*) Notice: Subject to any disclaimer, the term of this patent is extended or adjusted under 35 U.S.C. 154(b) by 0 days.

(21) Appl. No.: 15/140,149

(22) Filed: Apr. 27, 2016

(65) Prior Publication Data
US 2016/0235107 A1    Aug. 18, 2016

Related U.S. Application Data

(60) Provisional application No. 62/258,399, filed on Nov. 20, 2015.

(51) Int. Cl.
| | | |
|---|---|---|
| A23L 2/02 | (2006.01) | |
| A23L 2/60 | (2006.01) | |
| A23L 2/56 | (2006.01) | |
| A23B 7/005 | (2006.01) | |
| A23L 2/10 | (2006.01) | |
| A23L 27/12 | (2016.01) | |
| A23L 27/14 | (2016.01) | |

(52) U.S. Cl.
CPC .............. *A23L 2/02* (2013.01); *A23B 7/0056* (2013.01); *A23L 2/10* (2013.01); *A23L 2/56* (2013.01); *A23L 2/60* (2013.01); *A23L 27/13* (2016.08); *A23L 27/14* (2016.08)

(58) Field of Classification Search
CPC .. A23B 7/08; A23B 7/085; A23B 7/10; A23L 1/221; A23L 2/08; A23L 2/10; A23L 2/385; A23L 2/68; A47J 37/00

USPC .......................... 426/523, 599, 615, 638, 639
See application file for complete search history.

(56) References Cited

U.S. PATENT DOCUMENTS

| | | | | |
|---|---|---|---|---|
| 3,618,588 A | * | 11/1971 | Anwar ................. | A23G 3/32 127/34 |
| 5,433,965 A | * | 7/1995 | Fischer ................ | A23L 1/2366 426/548 |

OTHER PUBLICATIONS

"Caramelized Fruit Topping", Sep. 5, 2013, http://shrinkingkitchen.com/caramelized-fruit-topping/pp. 1-3.*
(Continued)

*Primary Examiner* — Helen F Heggestad
(74) *Attorney, Agent, or Firm* — Barry Choobin; Patent 360

(57) ABSTRACT

The embodiments herein relate to a composition of real fruit drink concentrate, a method of making the real fruit drink concentrate and a method of making hot as well as cold real fruit drinks. The real fruit drink concentrate comprises a plurality of fruits, spices, herbs, flowers, lemon juice, sugar and water. The method of preparing a real fruit drink concentrate comprises preparing a mixture. The mixture is prepared by mixing fresh or frozen fruit pieces, spices, sugar, lemon juice and a quantity sufficient water in a container. The mixture is cooked in a pre-heated oven at 420° F. till the caramelization of fruits and sugar occurs. A boiling water is added to the mixture and cooked again. The total cooking time is 45 minutes and the boiling water is added after at least $\frac{2}{3}^{rd}$ of the total cooking time. The mixture is canned. The canning is done by using a boiling water bath for 5-10 minutes. The mixture is stored in sealed jars in a cool dark place.

17 Claims, 1 Drawing Sheet

(56) References Cited

OTHER PUBLICATIONS

Hoffman, R. 1994, The California Wine Country Herbs and Spices Cookbook, The Hoffman Press, P. O. Box 2996,Santa Rosa, CA 95405, pp. 1, 2, 193.*
Rombauer, I. 1975, Joy of Cooking, The Bobbs-Meririll Co. inc. New York, pp. 835, 834.*
Derwent Week: 201430, "Beverage, preferably tea- and/or herbal beverage, comprises tea and/or herbal extract and fruit juice and/or fruit juice concentrate", pp. 1, 2, 2014.*
Stuckey, L. The Spice Cookbook, David White Company, 60 East 55$^{th}$ St.,, New York, NY, pp. 103102, 104106108.*

* cited by examiner

REAL FRUIT DRINK CONCENTRATE AND PROCESS OF PREPARING THE SAME

BACKGROUND

Technical Field of Invention

The embodiments herein generally relate to fruit beverages and particularly to real fruit hot and cold beverages. The embodiments herein more particularly relate to a composition of real fruit drink concentrate, a method of preparing the real fruit drink concentrate and a method of preparing hot and cold beverages using the prepared fruit concentrate.

Description of Related Art

In today's time, the beverages have become a more likable product in the market when it comes to having an energy drink. The energy drink is in the various forms such as cold drinks, fresh juices, soda drinks, etc. Fruit beverages have also become one of the popular and likable drinks especially among the children. There have been various kinds of fruit drinks such as smoothies, fruit teas, milk shakes, fruit flavoured drinks, etc.

The fruit drinks are considered to be another way of taking the fruits. The fruit drinks possess the potential vitamin and minerals and also form a good source of carbohydrates. During hot climate, these fruit drinks provide a good source of water and help in overcoming the nutrient loss.

There have been many fruit based beverages in the market. The difference between fresh fruit juices and the fruit beverages is that the fruit beverages can be stored for a longer time. The fruit drink beverages can also be formulated for a specific nutrient requirement such as calcium-supplemented fruit juice products.

The fruit drink products that are available in the market are composed of high amounts of artificial sweeteners. These artificial sweeteners are found to be harmful to the human health. The fruit drinks also comprise carbonated fruit beverages made primarily of carbonated water, a sugar syrup such as high fructose corn syrup, and natural or artificial flavourings well known in the beverage industry. But these carbonated drinks lack the naturally occurring nutrients in fruits. There have been fermented fruit drinks which are prepared by fermenting fruit pulp with lactic acid bacteria. But these fermented fruit drinks smell bad and are added with a lot of artificial sweeteners to make them tasty.

The above mentioned fruit drinks are found harmful to humans, for example, the high consumption of carbonated beverages is likely to affect bone growth and bone quality leading to osteoporosis, obesity, depleting dental health, gastrointestinal disorders and cause harm to the healthy development of young people. The fruit drink beverages containing coffee as main component affect the body's spirit state, and lead to obesity, depression, hypertension and other diseases. The instant coffee is also found to contain carcinogens.

With the advancement in the awareness of the health related issues of these fruit drinks in the society, the majority of consumers are opting for a healthy diet involving natural ingredients. Hence there is a need to develop a healthy real fruit drink or beverage comprising natural nutrients and causing no harm to the human body. There is a need to develop a healthy real fruit drink that is free from any artificial sweetener or any artificial ingredient, also that is free from caffeine and gluten. There is a demand for a drink which is 100% natural.

The above mentioned shortcomings, disadvantages and problems are addressed herein, as detailed below.

SUMMARY OF THE INVENTION

The primary object of the embodiments herein is to provide a composition and a method of making a real fruit drink concentrate, wherein the real fruit drink concentrate comprises pieces of real fruits, real fruit extracts along with the extracts of spices, herbs and flowers.

Another object of the embodiments herein is to provide a real fruit drink free from high sugar levels, caffeine and gluten, artificial sweeteners, artificial colors and flavors or any kind of preservative.

Yet another object of the embodiments herein is to provide a fruit drink comprising real fruit pieces.

Yet another object of the embodiments herein is to provide a real fruit drink that is made from completely natural ingredients having a longer shelf life.

Yet another object of the embodiments herein is to provide a hot as well as cold real fruit drink which is easy to prepare.

Yet another object of the embodiments herein is to provide a real fruit drink concentrate which is capable of making multiple servings.

Yet another object of the embodiments herein is to provide a real fruit drink concentrate used for making tasty Popsicles, to enhance smoothies and to make delicious toppings for ice creams, yogurts, oatmeals, waffles, pancakes, deserts and even cereals.

Yet another object of the embodiments herein is to provide a simple and novel method of making a real fruit drink concentrate and further a method for preparing a hot as well as a cold refreshing drink using the prepared fruit concentrate.

Hence, according to an embodiment herein a real fruit drink concentrate is provided. The real fruit drink concentrate comprises one or more fruits, a predetermined amount of sugar, one or more spices, a predetermined amount of lemon juice and quantity sufficient water. The one or more fruits comprise strawberry, blueberry, raspberry, blackberry, cranberry, mango, peach, apple, pear, cherry, sour cherry, plum, orange, tangerine, mandarin, red currant, apricot, pineapple, or lemon. The one or more spices comprise cinnamon, cardamom, cloves, anise, ginger, vanilla, or orange peel.

According to an embodiment herein, the real fruit drink concentrate further comprises an herb, wherein the herb is peppermint, wherein the herb is present in an amount of 4-5 tbsp.

According to another embodiment herein, the real fruit drink concentrate further comprises a flower, wherein the flower is chamomile.

According to an embodiment herein, the spices are present in an amount of 1.5-4 tbsp (tablespoon).

According to an embodiment herein, the predetermined amount of lemon juice is 100 ml.

According to an embodiment herein, the predetermined amount of sugar is 0.3 to 1.5 kgs.

According to an embodiment herein, the cloves are present in a quantity of at least 8-15 in number.

According to an embodiment herein, the anise is present in a quantity of at least 6-15 in number.

According to an embodiment herein, the real fruit concentrate further comprises vanilla extract, wherein the vanilla extract is present in an amount of 0.5-1.5 tbsp.

According to another embodiment herein, a method of preparing a real fruit drink concentrate is provided. The method of preparing a real fruit drink concentrate comprises preparing a mixture. The mixture is prepared by mixing one or more fruit pieces, one or more spices, a predetermined amount of sugar, a predetermined amount of lemon juice and a quantity sufficient water in a container. The mixture is cooked in a pre-heated oven till caramelization of fruits and sugar occurs. The oven is pre-heated at a predetermined temperature. The oven is pre-heated at a pre-determined temperature range of 400° F. to 430° F., wherein the oven is pre-heated at a preferable temperature of 420° F. Further, the boiling water is added and the mixture is cooked again. The total cooking time is 45 minutes and the boiling water is added after at least $\frac{2}{3}^{rd}$ of the total cooking time. The mixture is canned. The total time for canning is 5-10 minutes.

The fruits comprise strawberry, blueberry, raspberry, blackberry, cranberry, mango, peach, apple, pear, cherry, sour cherry, plum, orange, tangerine, mandarin, red currant, apricot, pineapple, or lemon. The one or more spices comprises cinnamon, cardamom, cloves, anise, ginger, vanilla, or orange peel. The predetermined amount of sugar is 0.3 to 1.5 kgs. The predetermined amount of lemon juice is 100 ml. The canning is done by using a boiling water bath. The canning is done for at least 5-10 minutes.

According to an embodiment herein, a hot drink is prepared using the real fruit concentrate. At least 2-3 tablespoon of the prepared real fruit concentrate is mixed with at least 8 ounce of boiling water to prepare a hot fruit drink.

According to another embodiment herein, a cold fruit drink is prepared using the real fruit concentrate. At least 2-3 tablespoon of the prepared fruit concentrate is mixed with at least 8 ounce of cold water to prepare a cold fruit drink.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a real fruit drink concentrate composition, a real fruit drink and a method of making the real fruit drink concentrate. The embodiments herein also provide a method of making a real fruit beverage or real fruit tea that is to be consumed hot or cold.

Figure 1:
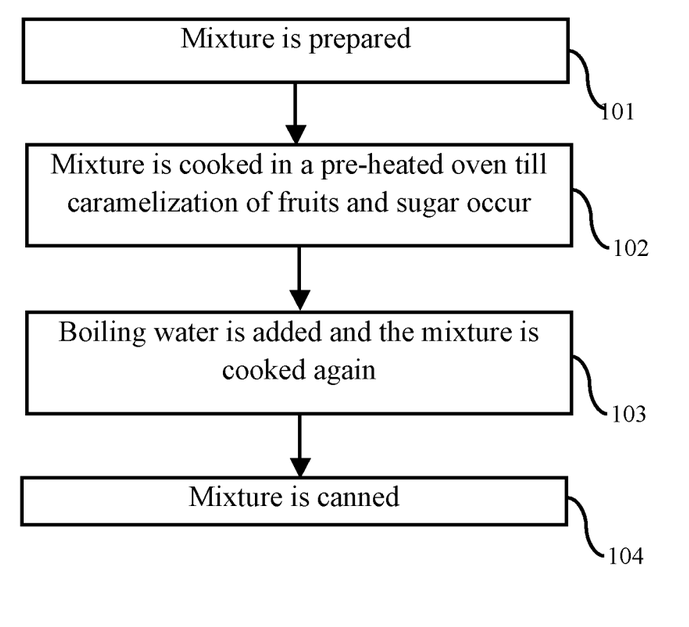
FIG. 1 is a flowchart showing the method of preparing the real fruit drink concentrate, according to an embodiment herein.

FIG. 1 is a flowchart showing the method of preparing the real fruit drink concentrate, according to an embodiment herein. With respect to FIG. 1, a mixture is prepared (101). The mixture is prepared by mixing one or more fruit pieces, one or more spices, a predetermined amount of sugar, a predetermined amount of lemon juice and a quantity sufficient water in a container. The mixture is cooked in a pre-heated oven till caramelization of fruits and sugar occur (102). The oven is pre-heated at a predetermined temperature. The oven is pre-heated at a pre-determined temperature range of 400° F. to 430° F., wherein the oven is pre-heated at a preferable temperature of 420° F. Further, the boiling water is added and the mixture is cooked again (103). The total cooking time is 45 minutes and the boiling water is added after at least $\frac{2}{3}^{rd}$ of the total cooking time. The mixture is canned (104). The canning is done for at least 5-10 minutes. The fruits comprise strawberry, blueberry, raspberry, blackberry, cranberry, mango, peach, apple, pear, cherry, sour cherry, plum, orange, tangerine, mandarin, red currant, apricot, pineapple, or lemon. The one or more spices comprises cinnamon, cardamom, cloves, anise, ginger, vanilla, or orange peel. The predetermined amount of sugar is 0.3 to 1.5 kgs. The predetermined amount of lemon juice is 100 ml. The canning is done by using a boiling water bath.

According to an embodiment herein, a hot drink is prepared using the real fruit concentrate. At least 2-3 tablespoon of the prepared real fruit concentrate is mixed with at least 8 ounce of boiling water to prepare a hot fruit drink.

According to another embodiment herein, a cold fruit drink is prepared using the real fruit concentrate. At least 2-3 tablespoon of the prepared fruit concentrate is mixed with at least 8 ounce of cold water to prepare a cold fruit drink.

The embodiments herein provide a method of making a fruit drink using fresh or frozen real fruits. The fruits are peeled, if needed, washed, rinsed and cut into pieces. The prepared fruits are mixed with predetermined amounts of sugar, a predetermined amount of lemon juice, spices, herbs or flowers in a large saucepan. The mixture is cooked. The method of cooking used in the present invention is by baking in oven. The oven is a pre-heated oven at a predetermined temperature of 420° F. The saucepan is placed inside the oven and baked at a temperature of 420° F. The mixture is baked till the fruits are caramelized, soft and release their juices. While stirring frequently, boiling water is added to the mixture and the mixture is further baked. The total baking time is 45 minutes. The boiling water is added after $\frac{2}{3}^{rd}$ of the total baking time. After the cooking process is over, the mixture is collected in plurality of sterilized jars using ladle and funnel. The jars are sealed and taken for canning process.

According to an embodiment herein, the process used for canning is by using a boiling water bath. The use of hot boiling water bath gives the product a longer shelf life. The jars are placed on a rack inside the boiling water bath canner. The lid is put and the water is allowed to boil. The jars are boiled gently and steadily for a predetermined time. The predetermined time is 5-10 minutes. When the cooking time is complete the jars are removed from the canner and placed on towels away from the heat. The jars are then stored in a cool and dark place for a longer storage life.

According to an embodiment herein, a fruit tea beverage is provided. The fruit tea beverage is 100% natural comprising pieces of real fruits. The fruit drink is made up of unprocessed fruits. The one or more fruits used in the present invention are strawberry, blueberry, raspberry, blackberry, cranberry, mango, peach, apple, pear, cherry, sour cherry, plum, orange, tangerine, mandarin, red currant, apricot, pineapple, or lemon.

According to an embodiment herein, the fruit drink is taken hot as a hot tea or as a hot fruit beverage. According to another embodiment herein, the fruit drink is taken cold, as an iced tea or a cold fruit beverage. The fruit drink is caffeine and gluten free with a high quality, taste and health benefits.

According to an embodiment herein, a composition for a real fruit drink concentrate is provided. The composition comprises one or more fruits, a predetermined amount of sugar, one or more spices, a predetermined amount of lemon juice and quantity sufficient water. The quantity sufficient water comprises an amount sufficient for giving a desired consistency. The concentrate can be thicker having less water according to an embodiment herein, or the concentrate can be made thinner by adding more amount of water. The fruits comprise strawberry, blueberry, raspberry, blackberry, cranberry, mango, peach, apple, pear, cherry, sour cherry, plum, orange, tangerine, mandarin, red currant, apricot, pineapple, or lemon. The spices comprise cinnamon, cardamom, cloves, anise, ginger, vanilla, or orange peel. The spices are present in an amount of 1.5-4 tbsp (tablespoon). The predetermined amount of sugar is 0.3 to 1.5 kgs. The lemon juice is present in a quantity of 100 ml.

According to an embodiment herein, the fruit drink concentrate further comprises an herb, wherein the herb is peppermint. The herb is present in an amount of 4-5 tbsp (tablespoon).

According to an embodiment herein, the fruit drink concentrate further comprises a flower, wherein the flower is chamomile.

According to an embodiment herein, the fruit drink concentrate comprises cloves, wherein the cloves are present in a quantity of at least 8-15 in number.

According to an embodiment herein, the fruit drink concentrate comprises anise, wherein anise is present in a quantity of at least 6-15 in number.

According to an embodiment herein, the fruit drink concentrate further comprises vanilla extract, wherein the vanilla extract is present in an amount of 0.5-1.5 tbsp.

According to an embodiment herein, a method of making a real fruit drink concentrate is provided. The method comprises preparing a mixture. The mixture is prepared by mixing a plurality of fruit pieces, a predetermined amount of sugar, a predetermined amount of lemon juice, and one or more spices in a container. The fruit pieces added are pieces of strawberry, pieces of blueberry, pieces of raspberry, pieces of blackberry, pieces of cranberry, pieces of mango, pieces of peach, pieces of apple, pieces of pear, pieces of cherry, pieces of sour cherry, pieces of plum, pieces of orange, pieces of tangerine, pieces of mandarin, pieces of red currant, pieces of apricot, pieces of pineapple, or pieces of lemon. The fruits used are fresh or frozen. The one or more spices added includes cinnamon, cardamom, cloves, anise, ginger, vanilla, or orange peel.

According to the embodiments herein, an oven is pre-heated at a pre-determined temperature range. The pre-determined temperature range is 400° F. to 450° F. according to an embodiment herein. The temperature is 420° F., according to a preferred embodiment herein. The mixture is baked in the pre-heated oven till caramelization. The caramelization is the stage where the fruit pieces become soft and release their juices. Caramelization is the browning of sugar, a process used extensively in cooking for the resulting nutty flavor and brown color. As the process occurs, volatile chemicals are released, producing the characteristic caramel flavor.

The boiling water is added to the mixture while stirring continuously. The boiling water is added after at least $2/3^{rd}$ of the cooking time, wherein the total cooking time is 45 minutes. The mixture is then collected in a sealed jar. The mixture is taken for canning. The canning is done in a boiling water bath. After canning, the jars are stored in dark place.

According to another embodiment herein, the mixture is added with an herb and a flower, wherein the herb is peppermint, and wherein the flower is chamomile.

According to an embodiment herein, a method of making a real fruit tea beverage comprises mixing a predetermined amount of real fruit concentrate in a predetermined amount of water, wherein at least 6 oz of the prepared fruit concentrate is mixed with water to make at least 6 healthy drink with real fruits pieces.

According to another embodiment herein, a hot real fruit tea is prepared by mixing at least 8 oz of boiling water with at least 2-3 tbs of the prepared fruit concentrate. According to another embodiment herein, a cold fruit drink is prepared by mixing at least 8 oz of cold water with at least 2-3 tbs of the prepared fruit concentrate. The fruit drinks are also topped with lemon, honey or ice.

According to another embodiment herein, the real fruit tea concentrate is used for making Popsicles, enhance smoothies and delicious toppings for ice creams, yogurt, oatmeal, waffles, pancakes, deserts and even cereals.

Unlike the sugared drinks and fruit juices, the real fruit beverage of the present invention, comprises medicinal properties as the ingredients used in the present invention possess medicinal properties. The real fruit juice of present invention is refreshing and energy boosting. The real fruit juice is free from caffeine and hence can be taken before sleep without fear of insomnia. Also this makes it absolutely safe for kids, elderly people and others. The fruit drink of the present invention is also highly rich in vitamin C which makes it ideal for warding off colds and other illnesses by keeping the immune system strong and healthy. Packed with anti-oxidants, the real fruit drink is a strength booster and gives the consumers a refreshing taste.

The fruit drink has antioxidants that slows down aging, fights allergies and helps to prevent cancer. The fruit drink helps lower the bad cholesterol and removes toxins from the body. The real fruit drink is high in Vitamin C which keeps the immune system strong and healthy.

According to an embodiment herein, the one or more spices comprises ginger, cinnamon, cardamom, anise, cloves, mint, chamomile or vanilla.

Ginger

Ginger has a long tradition of being very effective in alleviating symptoms of gastrointestinal distress. In herbal medicine, ginger is regarded as an excellent carminative (a substance which promotes the elimination of intestinal gas) and intestinal spasmolytic (a substance which relaxes and soothes the intestinal tract). Modern scientific research has revealed that ginger possesses numerous therapeutic properties including antioxidant effects, an ability to inhibit the formation of inflammatory compounds, and direct anti-inflammatory effects. Ginger is also effective in eliminating gastrointestinal distresses like dizziness, nausea, and vomiting. Ginger also contains gingerols which helps prevent various arthritis diseases and colorectal cancer. Ginger is one of the few spices that is ideal for boosting of the immune system.

Cinnamon

One of the most delicious and healthiest spices on the planet. It can lower blood sugar levels, can reduces your bad cholesterol (or LDL) and reduce heart disease risk factors. Cinnamon is known to have anti-oxidant, anti-diabetic, anti-viral, anti-septic and anti-inflammatory properties. Further, cinnamon may have anti-carcinogenic properties, and can help treat the symptoms of Alzheimer's and Parkinson's. Additionally, cinnamon is used to treat conditions such as coughing, arthritis and sore throats.

Cardamom

The health benefits of cardamom include gastrointestinal protection, cholesterol control, control of cancer, relief from cardiovascular issues, and the improvement of blood circulation in the body. Cardamom is rich in various vitamins, minerals and micronutrients as well. These include niacin, pyridoxine, riboflavin, thiamine, vitamin A, vitamin C, sodium, potassium, calcium, copper, iron, manganese, magnesium, phosphorous, and zinc. Have anti-carcinogenic, anti-asthmatic and anti-inflammatory properties. Good for cardiovascular health and control of cholesterol.

Anise

Known to have been anti-oxidant, disease preventing, and health promoting properties. Excellent source of B-complex vitamins & minerals like calcium, iron, copper, potassium, manganese, zinc and magnesium. Also contains good amounts of anti-oxidant vitamins such as Vitamin-C and Vitamin-A.

Cloves

The active principles in the clove are known to have antioxidant, anti-septic, local anaesthetic, anti-inflammatory properties. Clove also contains a good amount of omega-3 fatty acids, fibre, and minerals like potassium, manganese, iron, selenium and magnesium. Cloves have very good amounts of vitamin A and beta-carotene levels. These compounds are known to have antioxidant properties. Additionally, clove is a good source of Vitamin-K, Vitamin-B6 (pyridoxine), thiamine (vitamin B-1), Vitamin-C and riboflavin. Consumption of foods rich in vitamin C helps the body develop resistance against infectious agents and scavenge harmful oxygen-free radicals.

Mint

Mint leaves are rich in essential oils, vitamins and dietary fiber, which helps to control blood cholesterol and blood pressure. Mint is known to have anti-oxidant, disease-preventing and health promoting properties. Excellent source of minerals and it is rich in many antioxidant vitamins, including vitamin A, beta carotene, Vitamin-C and vitamin E. Further, mint is a calming and soothing herb that has been used to aid with upset stomach or indigestion. Helps with digestion, nausea & headache. Additionally, mint is used as a natural decongestant. Contain an antioxidant known as rosmarinic acid, which helps in relieving seasonal allergy symptoms.

Chamomile

Chamomile is one of the most ancient medicinal herbs known to mankind. It is used as a remedy for numerous medical complaints including asthma, colic, fevers reducer, nausea, nervous complaints, etc. Chamomile has anti-inflammatory properties and helps to treat a variety of digestive conditions. Chamomile helps with diabetes, soothes stomach ache, promotes sleep and healthy skin—with it's anti-inflammatory and anti-septic properties, chamomile helps in clearing up skin irritations such as eczema, acne, and allergies.

Vanilla

Natural vanilla extract contains numerous antioxidants, including vanillic acid and vanillin. Antioxidants protect your body from damage from harmful components, such as free radicals and toxins. Vanilla showed great potential as a health supplement and as a food preservative. Vanilla extract had powerful liver-protective abilities, as well as anti-inflammatory abilities. The vanillin found in vanilla extract may also have cholesterol-lowering benefits.

The present invention will be further described by way of examples. The below examples are not to be taken in limiting sense.

Example 1

A fruit drink was prepared using fresh or frozen real fruits. The fruits were peeled, if needed, washed, rinsed and cut into pieces. The prepared fruits were mixed with predetermined amounts of sugar, a predetermined amount of lemon juice, spices, herbs or flowers in a large saucepan. The mixture was cooked by baking in an oven. The oven was pre-heated at a predetermined temperature of 420° F. The saucepan was placed inside the oven and baked at a temperature of 420° F. The mixture was baked till the fruits were caramelized, soft and released their juices. While stirring frequently, boiling water was added to the mixture and the mixture was further baked. The total baking time was 45 minutes. The boiling water was added after ⅔rd of the total baking time. After the cooking process was over, the mixture was collected in plurality of sterilized jars with the help of funnel and ladle. The jars were sealed and taken for canning process. The jars were kept inside a boiling water bath. The lid was put and the water was allowed to boil. The jars were boiled gently and steadily for a predetermined time of 5-10 minutes. When the cooking time was complete the jars were removed from the canner and placed on towels away from heat. The jars were then stored in a cool and dark place for longer storage life.

TABLE 1

| STRAWBERRY WITH MINT | |
| --- | --- |
| fresh or frozen strawberries | 4.4 lbs (2 kg) |
| sugar | 2.75 lbs (1.25 kg) |
| pure lemon juice | 100 ml |
| fresh or dry peppermint leaves | 4-5 tbsp. |
| Cinnamon | 2 tbsp |
| anise star | 6 |
| cloves | 10 |
| Water | depend on the consistency of the mixture |

The formula for making strawberry fruit drink concentrate with mint as herb is shown in Table 1.

TABLE 2

MANGO CRANBERRY WITH VANILLA

| | |
|---|---|
| fresh or frozen mangos | 2.75 lbs (1.25 kg) |
| fresh or frozen cranberries | 1.65 lbs (0.75 kg) |
| sugar | 2.75 lbs (1.25 kg) |
| pure lemon juice | 100 ml |
| pure *vanilla* extract | 1.5 tbsp |
| cinnamon | 2 tbsp |
| cloves | 10 |
| Water | Quantity sufficient |

The formula for making mango and cranberry fruit drink concentrate along with vanilla flavour is shown in table 2.

Example 3

TABLE 3

BERRIES WITH CARDAMOM

| | |
|---|---|
| fresh or frozen berries (blackberry, raspberry, blueberry, strawberry) | 4.4 lbs (2 kg) |
| sugar | 2.75 lbs (1.25 kg) |
| pure lemon juice | 100 ml |
| cardamom | 4 tbsp. |
| cinnamon | 2 tbsp. |
| anise star | 6 |
| Cloves | 10 |
| pure *vanilla* extract | 0.5 tbsp. |
| Water | Quantity sufficient |

The formula for fruit drink made up of berries with cardamom flavour is shown in Table 3.

Example 4

TABLE 4

PEACH WITH GINGER

| | |
|---|---|
| fresh or frozen peaches | 4.4 lbs (2 kg) |
| sugar | 2.75 lbs (1.25 kg) |
| pure lemon juice | 100 ml |
| ginger | 4 tbsp. |
| cinnamon | 2.5 tbsp. |
| cloves | 10 |
| pure *vanilla* extract | 0.5 tbsp. |
| Water | Quantity sufficient |

The formula for fruit drink concentrate made of peach fruit and ginger as spice is shown in table 4.

Example 5

TABLE 5

APPLES WITH CINNAMON

| | |
|---|---|
| fresh or frozen peaches | 4.4 lbs (2 kg) |
| sugar | 2.75 lbs (1.25 kg) |
| pure lemon juice | 100 ml |
| cinnamon | 2.5 tbsp. |
| cloves | 10 |
| pure *vanilla* extract | 0.5 tbsp. |
| anise star | 6 |
| Water | depend on the consistency of the mixture |

The formula for the fruit drink concentrate made up of apples and cinnamon as spice is shown in table 5.

Example 6

TABLE 6

BLUEBERRY & CRANBERRY WITH ANISE

| | |
|---|---|
| fresh or frozen blueberries | 2.9 lbs (1.3 kg) |
| fresh or frozen cranberries | 1.5 lbs (0.7 kg) |
| sugar | 2.75 lbs (1.25 kg) |
| pure lemon juice | 100 ml |
| cinnamon | 2 tbsp. |
| cloves | 10 |
| pure *vanilla* extract | 1 tbsp. |
| anise star | 15 |
| Water | depend on the consistency of the mixture |

The formula for the preparing the fruit drink concentrate using blueberries and cranberries as fruit and anise as the main spice is shown in table 6.

Example 7

TABLE 7

ORANGE WITH CLOVES

| | |
|---|---|
| fresh oranges | 4.4 lbs (2 kg) |
| sugar | 2.75 lbs (1.25 kg) |
| pure lemon juice | 100 ml |
| cinnamon | 2 tbsp. |
| cloves | 15 |
| fresh orange peel | 1 tbsp. |
| Pure juice squeezed from | 2 fresh oranges |
| Water | depend on the consistency of the mixture |

The formula for preparing the fruit drink concentrate made of orange fruit and cloves as spices is shown in table 7.

Example 8

TABLE 8

ORANGE WITH GINGER & CLOVES

| | |
|---|---|
| fresh oranges | 4.4 lbs (2 kg) |
| sugar | 2.75 lbs (1.25 kg) |
| pure lemon juice | 100 ml |
| fresh lemon | 1 |
| ginger | 4 tbsp. |
| cinnamon | 2 tbsp. |
| cloves | 15 |
| fresh orange peel | 1 tbsp. |
| Pure juice squeezed from | 2 fresh oranges |
| Water | depend on the consistency of the mixture |

The formula for preparing fruit drink concentrate comprising orange as fruit and ginger and cloves as spices is shown in table 8.

Example 9

TABLE 9

CHERRY WITH CARDAMOM

| | |
|---|---|
| fresh or frozen cherries | 4.4 lbs (2 kg) |
| sugar | 2.75 lbs (1.25 kg) |

TABLE 9-continued

| CHERRY WITH CARDAMOM | |
| --- | --- |
| pure lemon juice | 100 ml |
| cardamom | 4 tbsp. |
| cinnamon | 2 tbsp. |
| anise star | 7 |
| cloves | 10 |
| Water | depend on the consistency of the mixture |

The formula for preparing a fruit drink concentrate comprising cherries with cardamom as spice is shown in table 9.

Example 10

TABLE 10

| RASPBERRY WITH CINNAMON | |
| --- | --- |
| fresh or frozen raspberries | 4.4 lbs (2 kg) |
| sugar | 2.75 lbs (1.25 kg) |
| pure lemon juice | 100 ml |
| cinnamon | 2.5 tbsp. |
| anise star | 6 |
| cloves | 10 |
| Water | depend on the consistency of the mixture |

The formula for preparing fruit drink concentrate made from raspberries as fruit and cardamom as spice is shown in table 10.

Example 11

TABLE 11

| PLUM WITH RAISINS | |
| --- | --- |
| fresh plums | 4.4 lbs (2 kg) |
| sugar | 2.75 lbs (1.25 kg) |
| raisins | 1.5 cup |
| pure lemon juice | 100 ml |
| cinnamon | 2 tbsp. |
| anise star | 6 |
| cloves | 10 |
| Water | depend on the consistency of the mixture |

The formula for preparing fruit drink concentrate made from plums as fruits comprising raisins is shown in table 11.

Example 12

TABLE 12

| APPLE PLUM WITH CHAMOMILE & CRANBERRY | |
| --- | --- |
| fresh or frozen cranberries | 0.9 lbs (0.4 kg) |
| fresh or frozen apples | 1.75 lbs (0.8 kg) |
| fresh plums | 1.75 lbs (0.8 kg) |
| sugar | 2.75 lbs (1.25 kg) |
| chamomile | 8 tbsp. |
| pure lemon juice | 100 ml |
| cinnamon | 1.5 tbsp. |
| Water | depend on the consistency of the mixture |

The formula for preparing fruit drink concentrate made from apples, plums and berries with chamomile flower is shown in table 12.

Example 13

TABLE 13

| BLUEBERRY WITH CARDAMOM | |
| --- | --- |
| fresh or frozen blueberries | 4.4 lbs (2 kg) |
| sugar | 2.75 lbs (1.25 kg) |
| pure lemon juice | 100 ml |
| cardamom | 4 tbsp. |
| cinnamon | 2 tbsp. |
| anise star | 6 |
| cloves | 10 |
| Water | depend on the consistency of the mixture |

The formula for preparing fruit drink concentrate made from blueberries as fruit and cardamom as spice is shown in table 13.

Example 14

TABLE 14

| PEAR WITH CRANBERRIES & GINGER | |
| --- | --- |
| fresh pears | 2.75 lbs (1.25 kg) |
| fresh or frozen cranberries | 1.65 lbs (0.75 kg) |
| sugar | 2.75 lbs (1.25 kg) |
| pure lemon juice | 100 ml |
| ginger | 4 tbsp. |
| cinnamon | 2 tbsp. |
| anise star | 6 |
| Water | depend on the consistency of the mixture |

The formula for preparing the fruit drink concentrate made from pears and cranberries as fruits and ginger as the spice is shown in table 14.

Example 15

TABLE 15

| PINEAPPLE WITH CARDAMOM | |
| --- | --- |
| fresh or frozen pineapples | 2.9 lbs (1.3 kg) |
| fresh or frozen mangos | 1.54 lbs (0.7 kg) |
| sugar | 2.75 lbs (1.25 kg) |
| pure lemon juice | 100 ml |
| cardamom | 4 tbsp. |
| cinnamon | 1.5 tbsp. |
| anise star | 6 |
| cloves | 10 |
| Water | depend on the consistency of the mixture |

The formula for preparing fruit drink concentrate made from pineapples and cardamom as spice is shown in table 15.

Example 16

TABLE 16

| APRICOT WITH CINNAMON | |
| --- | --- |
| fresh apricots | 2.9 lbs (1.3 kg) |
| fresh or frozen apples | 0.9 lbs (0.4 kg) |
| fresh or frozen red currant | 0.6 lbs (0.3 kg) |
| sugar | 2.75 lbs (1.25 kg) |
| pure lemon juice | 100 ml |
| cinnamon | 2.5 tbsp. |
| cloves | 10 |
| Water | depend on the consistency of the mixture |

The formula for preparing fruit drink concentrate made from apricots and cinnamon spice is shown in table 16.

Example 17

TABLE 17

| BLACKBERRY WITH CARDAMOM | |
| --- | --- |
| fresh or frozen blackberries | 4.4 lbs (2 kg) |
| sugar | 2.75 lbs (1.25 kg) |
| pure lemon juice | 100 ml |
| cardamom | 4 tbsp. |
| cinnamon | 2 tbsp. |
| anise star | 7 |
| cloves | 10 |
| Water | depend on the consistency of the mixture |

The formula for preparing fruit drink concentrate made from blackberries with cardamom as spice is shown in table 17.

Example 18

TABLE 18

| STRAWBERRY BLUEBERRY WITH ANISE | |
| --- | --- |
| fresh or frozen strawberries | 2.2 lbs (1 kg) |
| fresh or frozen blueberries | 2.2 lbs (1 kg) |
| sugar | 2.75 lbs (1.25 kg) |
| pure lemon juice | 100 ml |
| cinnamon | 2 tbsp. |
| anise star | 15 |
| cloves | 10 |
| pure *vanilla* extract | 1 tbsp. |
| Water | depend on the consistency of the mixture |

The formula for preparing the fruit drink concentrate made from strawberries and blueberries with anise as the main spice is shown in table 18.

Example 19

TABLE 19

| PEAR WITH PLUM & GINGER | |
| --- | --- |
| fresh pears | 2.2 lbs (1 kg) |
| fresh plums | 2.2 lbs (1 kg) |
| sugar | 2.75 lbs (1.25 kg) |
| ginger | 4 tbsp. |
| pure lemon juice | 100 ml |
| cinnamon | 2 tbsp. |
| anise star | 6 |
| cloves | 10 |
| Water | depend on the consistency of the mixture |

The formula for preparing the fruit drink concentrate made from pears and plums fruits and ginger as the main spice is shown in table 19.

Example 20

TABLE 20

| MANDARIN WITH GINGER | |
| --- | --- |
| fresh mandarins | 4.4 lbs (2 kg) |
| sugar | 2.75 lbs (1.25 kg) |
| ginger | 4 tbsp. |
| pure lemon juice | 100 ml |
| cinnamon | 2 tbsp. |
| anise star | 6 |
| cloves | 10 |
| Water | depend on the consistency of the mixture |

The formula for preparing the fruit drink concentrate made from fruit mandarins and ginger as spice is shown in table 20.

The real fruit drink concentrate in 6 oz jar makes at least 4-6 servings of the drink.

The fruit drink is tea and a fruit beverage. The fruit drink is 100% natural concentrated fruit drink with pieces of real fruit. The fruit drink is made from real unprocessed fruits. The real fruit drink product is not caffeine based unlike other teas. The real fruit drink product is not made from dry fruits and herbs like other teas are made as tea bags. The real fruit drink product has a liquid consistency, not like other tea bags that have dry consistency and contains dry fruits or herbs.

The real fruit drink product can be consumed as hot drink such as like a Hot tea or as a hot fruit beverage. The real fruit drink product can also be consumed as a Cold drink such as Iced tea or like any cold fruit beverage. The real fruit drink concentrate prepared according to the present invention can be used to make hot drink as well as cold drink.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

What is claimed is:

1. A real fruit drink concentrate consisting essentially of:
one or more caramelized fruits, wherein the caramelized fruit is made from caramelized canned fruit prepared by mixing one or more fruit pieces, one or more spices, a predetermined amount of sugar, a predetermined amount of lemon juice and a quantity sufficient water in a container, and wherein a predetermined amount of fruits is 0.8 kgs to 2 kgs;

cooking the mixture in a pre-heated oven till caramelization of fruits and sugar, wherein the oven is pre-heated at a pre-determined temperature range of 400° F. to 430° F.;

adding boiling water and cooking the mixture again, wherein a total cooking time is 45 minutes, and wherein the boiling water is added after at least ⅔rd of the total cooking time; and canning the mixture, wherein the mixture is canned for at least 5-10 minutes; wherein one or more fruits includes strawberry, blueberry, raspberry, blackberry, cranberry, mango, peach, apple, pear, cherry, sour cherry, plum, orange, tangerine, mandarin, red currant, apricot, pineapple, or lemon, wherein a predetermined amount of fruits is 0.8 kgs to 2 kgs;

a predetermined amount of sugar;

one or more spices, wherein one or more spices include cinnamon, cardamom, cloves, anise, ginger, vanilla, or orange peel;

a predetermined amount of lemon juice;

a sufficient quantity of water to get a desired consistency; and a herb.

2. The real fruit concentrate according to claim 1, wherein the herb is peppermint present in an amount of 4-5 tbsp.

3. The real fruit concentrate according to claim 1, wherein the spices are present in an amount of 1.5-4 tbsp (tablespoon).

4. The real fruit concentrate according to claim 1, wherein the predetermined amount of lemon juice is 100 ml.

5. The real fruit concentrate according to claim 1, wherein the predetermined amount of sugar is 0.3 to 1.5 kgs.

6. The real fruit concentrate according to claim 1, wherein the cloves are present in a quantity of at least 8-15 in number.

7. The real fruit concentrate according to claim 1, wherein the anise is present in a quantity of at least 6-15 in number.

8. The real fruit concentrate according to claim 1, wherein the concentrate further comprises vanilla extract, wherein the vanilla extract is present in an amount of 0.5-1.5 tbsp.

9. A method of preparing a real fruit drink concentrate consisting essentially of:

preparing a mixture, wherein the mixture is prepared by mixing one or more fruit pieces, one or more spices, a predetermined amount of sugar, a predetermined amount of lemon juice and a quantity sufficient water in a container, and wherein a predetermined amount of fruits is 0.8 kgs to 2 kgs;

cooking the mixture in a pre-heated oven till caramelization of fruits and sugar, wherein the oven is pre-heated at a pre-determined temperature range of 400° F. to 430° F.;

adding boiling water and cooking the mixture again, wherein a total cooking time is 45 minutes, and wherein the boiling water is added after at least ⅔rd of the total cooking time; and canning the mixture, wherein the mixture is canned for at least 5-10 minutes.

10. The method according to claim 9, wherein fruits include strawberry, blueberry, raspberry, blackberry, cranberry, mango, peach, apple, pear, cherry, sour cherry, plum, orange, tangerine, mandarin, red currant, apricot, pineapple, or lemon.

11. The method according to claim 9, wherein one or more spices include cinnamon, cardamom, cloves, anise, ginger, vanilla, or orange peel.

12. The method according to claim 9, wherein the predetermined amount of sugar is 0.3 to 1.5 kgs.

13. The method according to claim 9, wherein the predetermined amount of lemon juice is 100 ml.

14. The method according to claim 9, wherein the oven is pre-heated at a temperature of 420° F.

15. The method according to claim 9, wherein the canning is done by using a boiling water bath.

16. The method according to claim 9, wherein at least 2-3 tablespoon of the prepared real fruit concentrate is mixed with at least 8 ounce of boiling water to prepare a hot fruit drink.

17. The method according to claim 9, wherein at least 2-3 tablespoon of the prepared fruit concentrate is mixed with at least 8 ounce of cold water to prepare a cold fruit drink.

\* \* \* \* \*